United States Patent [19]

Miyabayashi et al.

[11] Patent Number: 4,802,050
[45] Date of Patent: Jan. 31, 1989

[54] MAGNETIC RECORDING MEDIUM

[75] Inventors: Takeshi Miyabayashi; Takemi Yamamoto, both of Nagoya, Japan

[73] Assignee: Brother Kogyo Kabushiki Kaisha, Japan

[21] Appl. No.: 16,666

[22] Filed: Feb. 19, 1987

[30] Foreign Application Priority Data

Feb. 21, 1986 [JP] Japan .................................. 61-37693
Jul. 17, 1986 [JP] Japan ................................ 61-168710
Sep. 9, 1986 [JP] Japan ................................ 61-212409

[51] Int. Cl.$^4$ .......................... G11B 5/82; G11B 5/74
[52] U.S. Cl. ..................................... 360/135; 360/131
[58] Field of Search ............... 360/135, 133, 131, 134; 235/493

[56] References Cited

U.S. PATENT DOCUMENTS

| | | | | |
|---|---|---|---|---|
| 2,144,844 | 6/1939 | Hickman | | 360/135 |
| 3,214,178 | 10/1965 | Warnke | | 360/135 |
| 3,258,750 | 6/1966 | Shew | | 360/135 |
| 3,452,358 | 6/1969 | Zehner | | 235/493 |
| 3,453,598 | 7/1969 | Schweizer | | 235/493 |
| 3,460,118 | 8/1969 | Woolfolk | | 360/135 |
| 3,593,331 | 7/1971 | Connell et al. | | 360/135 |
| 4,016,603 | 4/1977 | Ottesen | | 360/135 |

Primary Examiner—Vincent P. Canney
Attorney, Agent, or Firm—Kane, Dalsimer, Sullivan, Kurucz, Levy, Eisele and Richard

[57] ABSTRACT

A magnetic recording medium is disclosed wherein the data tracks are formed of magnetic layers and the non-data tracks are formed of non-magnetic layers. The data tracks and non-data tracks are alternately disposed and the non-data tracks do not effect recording/reproducing/erasing of the data tracks. Another medium is disclosed wherein the magnetic and non-magnetic layers are alternately disposed in the direction of recording/reproducing and the magnetizing transition width is shortened so that the bit length may be shortened. A reproducing apparatus is also disclosed which includes a discriminator for discriminating the magnetizing direction of the magnetic layer on the data tracks on the basis of a detection signal fed from the reproducing head.

7 Claims, 7 Drawing Sheets

MAGNETIC RECORDING MEDIUM

BACKGROUND OF THE INVENTION

1. Field of the Invention

The present invention relates to magnetic recording media such as a cassette tape, a floppy disc, a hard disc and the like.

2. Prior Art

In the past, the recording areas in magnetic recording media such as a cassette tape, a floppy disc, a hard disc and the like, have been formed of magnetic layers. As a result, recording can be made at any position on data tracks formed on the recording media.

However, noise/overwrite from areas unnecessary for recording/reproducing is appreciable. Accordingly, the residual noise characteristic or the overwrite characteristic deteriorates.

To avoid this defect, floppy disc units have employed a method of performing DC erasing for opposite sides of a recording track in order to homogenize the magnetizing direction of the two sides of the recording track before recording or a method of performing DC erasing for the opposite sides of a recording track after recording.

However, noise cannot completely be removed from the area where DC erasing has been made.

Furthermore, floppy disc units of the type using DC erasing of the opposite sides before recording, has a disadvantage that head access time is prolonged. Floppy disc units of the type using DC erasing of the opposite sides after recording, has a disadvantage that two or more erasing heads are required separately from the recording head to thereby make the assembling structure complicated and make the cost high.

Although hard disc units can perform recording/reproducing by use of a single head, noise cannot completely be removed from the area where erasing has been made.

In the case where recording is made on recording media such as a floppy disc unit and a hard unit, the floating amount h of the recording head increases at the outermost part of the disc because of the difference in linear velocity V in the direction of the radius of the disc. Accordingly, the distance (spacing) between the disc and the recording head increases to thereby enlarge the recording electric current, Iw. Consequently, the width of an outer track is larger than that of an inner track.

Furthermore, a reproductive output difference arises between the outer part and the inner part of the disc. Factors causing the difference are considered to be (1) the linear velocity V, (2) the head floating amount h, (3) the recording current Iw, (4) the leakage magnetic field intensity Hm of the head on the disc surface, (5) the rate of magnetic flux change dMr/dt, and the like.

The reproductive output, that is, the rate of magnetic flux change dMr/dt, is influenced by the linear velocity V, as shown in FIG. 4. Accordingly, it is apparent that the reproductive output in the outer circumferential part of the disc is larger than the reproductive output in the inner circumferential part of the disc, because the linear velocity V in the outer circumferential part is larger than that in the inner circumferential part. Furthermore, the head floating amount h increases as the linear velocity V increases. Accordingly, the reproductive output decreases as the floating amount h increases.

On the other hand, the reproductive output is influenced by the magnetic wall thickness (magnetic transition width) of the track at the time of reproduction. As the magnetic transition width Wj decreases, the reproductive output increases. In general, the magnetic transition width Wj satisfies the following relation:

$$Wj \alpha (t \cdot Br)^{a58} \cdot Gh^{-0.54}$$

where t represents the thickness of the magnetic film, Br represents the residual magnetic flux density, and Gh represents the magnetic head magnetic field gradient. Accordingly, it is apparent that, as the magnetic head magnetic field gradient Gh decreases, the magnetic transition width Wj increases and the reproductive output decreases.

The magnetic head magnetic field gradient Gh is influenced by the respective values of the recording current Iw and the leakage magnetic field intensity Hm. The recording current Iw is influenced by the floating amount h. The leakage magnetic field intensity Hm is influenced by both the recording current Iw and the floating amount h. Accordingly, as the head floating amount h increases, the magnetic head magnetic field gradient Gh decreases, and consequently, the magnetic transition width Wj increases.

In short, the reproductive output is proportional to the factors, such as the linear velocity V, the recording current Iw, the leakage magnetic field intensity Hm of the head on the disc surface, and the like, while inversely proportional to the floating amount h of the head.

Though considering that the floating amount of the outer part is larger than that of the inner circumferential part with respect to a magnetic disc in which recording is made with a suitable value of the recording current Iw, the reproductive output in the outer circumferential part is larger than the reproductive output in the inner circumferential part because the velocity V in the other circumferential part is larger than the velocity in the inner circumferential part. In addition, conventionally the lower limit of the reproductive output is established by reference to the innermost track because the reproductive output at the innermost track is lower than the reproductive output at the outermost track. Accordingly, the lower limit should be established to a very large value, because the reproductive output increases as the position shifts to the outer circumferential part of the disc. As the result, not only a circuit for keeping the reproductive output constant has been required but efficient recording could not be made.

Further, in hard discs there has been such a problem that, when overwritten, the bit position is displaced to thereby make the overwrite characteristic poor.

In a method of surface magnetization as shown in FIG. 12, with regard to the magnetizing level L with respect to the magnetic pattern formed on the data track DT, the reverse magnetic intensity is most strong at the boundary between bits, that is, at the magnetic wall part, and the width W thereof (magnetic transition width) is large. As the result, a sharp reproductive waveform S cannot be obtained, and, accordingly, there has been a limit in shortening the bit length. Accordingly, the limitation has caused a problem in attempts at high density recording.

SUMMARY OF THE INVENTION

It is therefore an object of the present invention to eliminate the above-discussed detects in the prior art.

It is another object of the invention to provide a magnetic recording medium in which the overwrite characteristic as well as the residual noise characteristic are improved compared with the conventional magnetic recording media and in which information for positioning the head can be obtained by a novel method quite distinctive from the prior art one.

It is a further object of the invention to provide a magnetic recording medium in which the reproductive output level can be kept constant at all recording tracks from the innermost recording track to the outermost recording track in the magnetic recording disc to thereby perform magnetic recording with high efficiency.

It is a still further object of the invention to provide a magnetic recording medium in which record can be made with high density, and to provide an apparatus for reproducing the same.

To attain the foregoing objects, according to a first aspect of the present invention, the magnetic recording medium is featured in that data tracks are formed of magnetic layers, and non-data tracks are formed of non-magnetic layers, the data tracks and the non-data tracks being alternately disposed. In the arrangement according to the first aspect of the invention, the non-data tracks have no effect on the magnetic change to the data tracks formed of magnetic layers, so that recording/reproducing/erasing in the data tracks formed of magnetic layers can be securely made with no influence of the non-data tracks.

According to a second aspect of the invention, the data tracks are composed of magnetic layers and non-magnetic layers, the magnetic layers and the non-magnetic layers being alternately disposed in the direction of recording/reproducing. In the arrangement according to the second aspect of the invention, magnetizing transition width can be shortened to a high degree owing to the non-magnetic layers interposed between adjacent magnetic layers, so that the bit length can be shortened to thereby realize high density. Furthermore, data recording is made at the respective magnetic layer at all times.

According to a third aspect of the invention, a magnetic recording medium reproducing apparatus comprises: a magnetic recording medium according to the second aspect of the invention, which is provided with data tracks composed of magnetic layers and non-magnetic layers alternately disposed in the direction of recording/reproducing; moving means for moving the data tracks of the recording medium relatively to a reproducing magnetic head; and discriminating means for discriminating the magnetizing direction of the respective magnetic layer on the data tracks on the basis of a detection signal fed from the reproducing magnetic head. In the arrangement according to the third aspect of the invention, the output pattern of the magnetic head varies depending on the magnetizing direction of the magnetic layers when the magnetic head passes through a boundary between a magnetic layer and an adjacent non-magnetic layer. Only by performing a judgment on the basis of the output pattern, it is possible to read information.

The foregoing and other objects, features, and advantages of the invention will become more apparent from the following description in connection with the drawings.

DESCRIPTION OF PREFERRED EMBODIMENTS

The embodiments of the invention will be described in detail with reference to the drawings.

Figure 1A:
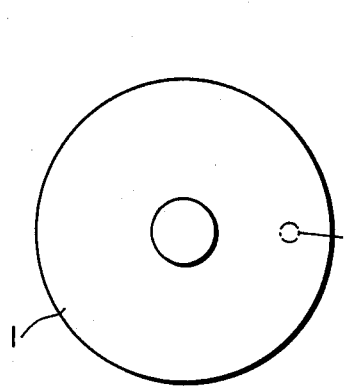
FIGS. 1A and B are a diagram for explaining data tracks and non-data tracks in the magnetic disc according to a first embodiment of the invention.
Figure 1B:
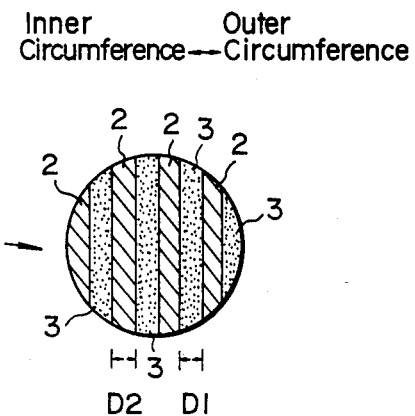
Figure 2:
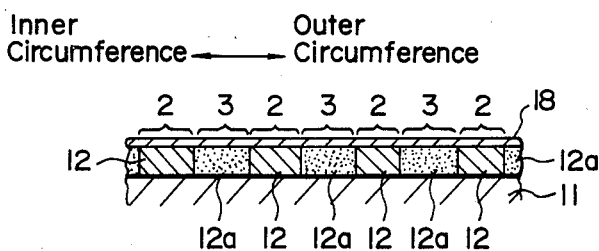
FIG. 2 is a diagram for explaining the structure of the magnetic disc.
Figure 3:
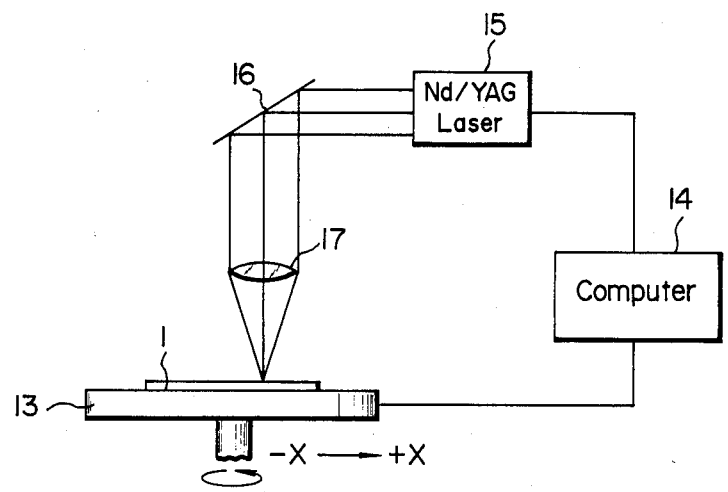
FIG. 3 is a diagram for explaining a method of forming the data tracks and the non-data tracks.

Referring to FIGS. 1 through 3, a first embodiment of the invention will be now described hereunder.

In FIG. 1, a magnetic disc 1, acting as a recording medium, has a plurality of data tracks 2 capable of recording data, and a plurality of non-data tracks 3 incapable of recording data, the tracks being alternately disposed to form coaxial circles. The non-data tracks 3 are formed of a non-magnetic material. In this embodiment, the width D1 of the respective non-data track is selected to be 100 microns.

On the other hand, the data tracks 2 are formed of a magnetic material. The width D2 of the respective data track 2 is reduced as the position of the data track 2 moves from the center of the magnetic disc 1 toward the outer circumference of the same. In this embodiment, the widest value of the width D2, which is of the innermost data track, is smaller than the gap width of the magnetic head (in the direction perpendicular to the reading direction).

In the following, the method of manufacturing the magnetic disc 1 is explained.

First, magnetic layers 12 of a magnetic medium, such as cobalt-phosphorus (Co-P) or the like, are disposed on a disc substrate 11 by a known method. Next, the disc substrate 11 having the magnetic layers 12 thereon is placed on a table 13 in an atmosphere of nitrogen so that the rotational center of the table 13 coincides with the center point of the disc substrate 11 as shown in FIG. 3. The table 13 is controlled by a computer 14 which controls the rotation of the table 13 and gives a transversely reciprocating motion (in the direction of the X-axis) to the table 13.

Furthermore, the computer 14 controls an Nd/YAG laser so that the surface of the disc substrate 11 on the table 13 is irradiated with the light of the laser beam through a reflecting mirror 16 and a condenser lens 17. The position of irradiation is established so that the rotational center position of the table 13 (the center position of the disc substrate 11) can be irradiated when the table 13 is placed at a predetermined original position. Accordingly, when the table 13 is moved in the direction of the X axis, the position irradiated with the laser light gradually shifts to the outer circumference of the disc substrate 11.

Thereafter, the procedure of forming the non-data tracks 3 successively from the inner-circumferential side of the disc substrate 11 is started. First, to form the innermost non-data track 3, the computer 14 operates to move the table 13 so that the position where the track is to be formed coincides with the irradiation position. After the movement of the table 13, the computer 14 actuates the Nd/YAG laser 15 to irradiate the magnetic layer formed on the disc substrate 11 with the laser beam while rotating the table 13 at the same time.

When the surface temperature rises to 400° C. owing to the laser beam, the heated part of the magnetic layer 12, that is, the magnetic medium such as cobalt-phosphorus (Co-P) or the like, is transformed to a non-magnetic layer 12a. While the table 13 makes a turn, an annular non-magnetic layer 12a is formed or in other words the innermost non-data track 3 is produced. The width D1 of the non-data track 3 is determined depending on the degree of convergence of the condenser lens 17. In this embodiment, the degree of convergence of the condenser lens 17 is predetermined so that the width D1 of 100 microns as described above is formed corresponding to one rotation.

Next, to form the second non-data track 3, the computer 14 operates to move the table 13 so that the position where the second non-data track 3 is formed should coincides with the irradiation position after consideration of the width D2 of a data track 2 formed between the first, directly aforementioned non-data track 3 and the second non-data track 3. After the movement of the table 3, the computer 14 actuates the Nd/YAG laser 15 to irradiate the magnetic layer 12 formed on the disc substrate 11 with the laser beam, while rotating the table 13 at the same time, in the same manner as described above. Thus, the second non-data track 3 is formed. Accordingly, the part between the first non-data track 3 and the second non-data track 3, that is, the part not heated, is not transformed by the laser beam, so that an annular magnetic layer 12 remains as it is to form a data track 2.

The same procedure is repeated until the outermost non-data track 3 is formed. Consequently, an alternate disposition of the data tracks 2 and the non-data tracks 3 is formed on the disc substrate 11.

Thereafter, a protective film 18 of silicon dioxide (SiO$_2$) is formed on the thus formed alternate disposition of the two types of tracks by vacuum evaporation. Thus, the production of the magnetic disc 1 is completed.

As described above, because the magnetic disc 1 of this embodiment is so constructed that the data tracks 2 capable of recording information and the non-data tracks 3 incapable of recording information are alternately coaxially disposed, or in other words, because the non-data tracks 3 are respectively formed at the opposite sides of data tracks 2, there is no possibility of changing reproductive output level or gathering noise owing to the slippage (off-track) in reading position at the time of reproduction, unlike the prior art. Furthermore, the overwrite characteristic as well as the residual noise characteristic can be improved at the time of erasing.

The value of the track width D2 of the aforementioned respective data track 2 is narrower as the position of the track moves from the center of the disc 1 toward the outer circumference of the same. More specifically, the tracks widths D2 of the respective data tracks 2 are selected so that the reproductive output level when information is read out of the respective data track 2 is kept constant with respect to the all the data tracks 2.

Figure 4:
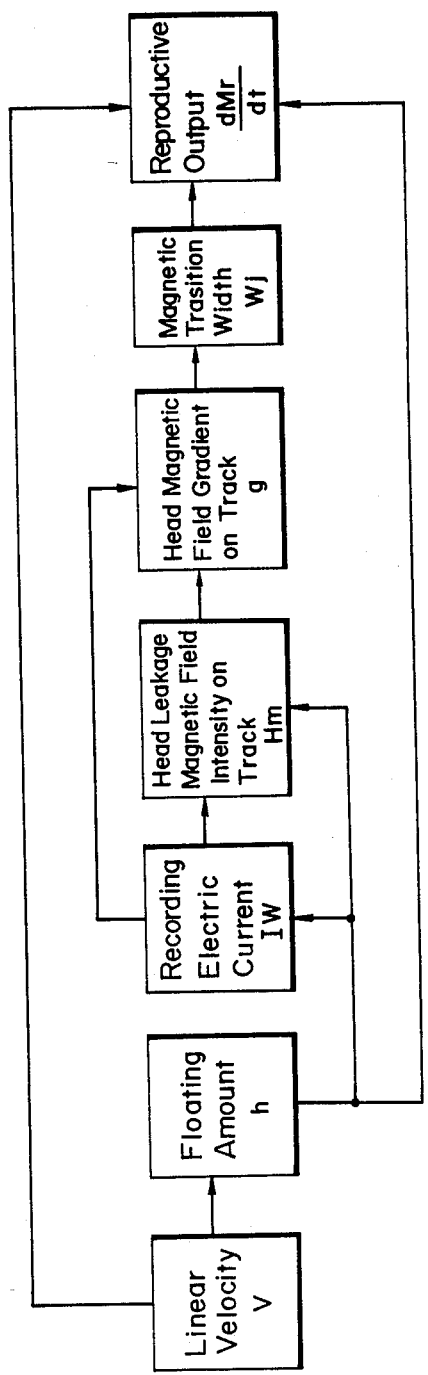
FIG. 4 is a flowchart showing factors exerting influence onto the reproductive output.

FIG. 4 shows factors influencing the reproductive output of the magnetic disc 1. In the those factors shown in FIG. 4, the factors contributing to the improvement of the reproductive output at the inner circumferential part of the disc are the floating amount h and the recording current Iw, and the factors contributing to the improvement of the reproductive output at the outer circumferential part of the disc are the linear velocity V and the leakage magnetic field intensity Hm of the reproductive magnetic head on the data track 2. In this embodiment, the factors excepting the linear velocity V are not considered, because the linear velocity V has the greatest effect on the reproductive output compared with the three other factors. The reproductive output level increases in proportion to the linear velocity V. On the contrary, when the width D2 of the data track 2 is reduced under the condition that the linear velocity V is kept constant, the reproductive output level is correspondingly reduced. It is apparent from this that the reproductive output level at all the data tracks 2 can be kept constant when the track width D2 for reproduction is reduced in inverse proportion to the linear velocity V.

On this condition, the width D2 of the respective data track 2 formed on the magnetic disc 1 of this embodiment is more reduced as the position of the data track moves from the center of the disc toward the outer circumferential part where the linear velocity V becomes high.

The linear velocity V at the respective position radially arranged on the magnetic disc 1 can be found beforehand. Accordingly, the width D2 of the respective data track 2 can be easily obtained.

As described above, after the alternate disposition of the data tracks 2 and the non-data tracks 3 has been formed on the disc substrate 11, the protective film 18 of silicon dioxide (SiO$_2$) is formed on the thus formed alternate disposition of the two types of tracks 2 and 3 by vacuum evaporation, so as to complete the production of the magnetic disc 1.

As described above, because the magnetic disc 1 of this embodiment is so constructed that the data tracks 2 capable of recording information and the non-data tracks 3 incapable of recording information are alternately coaxially disposed, or in other words, because the non-data tracks 3 are formed at the opposite sides of the respective data tracks 2, there is no possibility of changing reproductive output level or gathering noise owing to the slippage (off-track) in reading position at the time of reproduction, unlike the prior art. Furthermore, the overwrite characteristic and the residual noise characteristic can be improved at the time of erasing.

Furthermore, because the magnetic disc 1 of this embodiment is so constructed that the width D2 of the data track 2 is reduced as the position of the track is further from the center of the magnetic disc 1 toward the outer circumferential part of the same and that the width D2 is less than the width of the magnetic head gap, it is possible to eliminate the variations in reproductive output level owing to a difference in linear velocity taken in the direction of the radius of the magnetic disc 1. Accordingly, the reproductive output level can be kept constant independently of the inner circumferential part or outer circumferential part of the magnetic disc 1 and efficient magnetic recording can be carried out.

In addition, because the data tracks 2 and the non-data tracks 3 are alternately disposed, the level of signal detected by the reproduction magnetic head is distinguished by the presence of the magnetic flux when the magnetic head moves radially relative to the magnetic disc 1 to cross the data track 2 and the non-data track 3, that is, to cross the magnetic layer 12 and the non-magnetic layer 12a. As the result, the position of the magnetic head in the direction of the radius of the magnetic disc 1 can be found by reference to the detection signal. Accordingly, complicated positioning means in the prior art, such as a magnetic head positioning servohead and the like, can be omitted. Consequently, cost can be reduced and accurate positioning control can be realized.

The present invention is not limited to the specific embodiment described above. For example, the width D1 of the non-data track 3 or the width D2 of the data track 2 can be suitably changed. Although the embodiment shows the case where the invention is applied to a magnetic disc such as a hard disc, a floppy disc or the like, the invention is applicable to other magnetic media such as a magnetic drum, a magnetic tape, etc.

Although the embodiment shows the case where the non-data tracks 3 and the data tracks 2 are formed to be alternately disposed by using the laser 15, the method for forming tracks is not limited to the described specific method. For example, the data tracks 2 in the form of the magnetic layers 12 and the non-data tracks 3 in the form of the non-magnetic layers 12a may be formed by other methods such as etching vacuum evaporating or the like.

Although the embodiment shows the case where the width D2 of the data track 2 is changed on the basis of the linear velocity V, the width D2 may be selected on the basis of any one of the aforementioned factors, such as the magnetic head floating amount h, the recording current Iw, the magnetic head leakage magnetic field intensity Hm, and the like, or any suitable combination of such factors.

As described above, the first embodiment of the present invention is advantageous in that the variation in output level owing to off-track can be reduced to thereby improve the over-write characteristic and the residual noise characteristic compared with the conventional magnetic recording media, in that information for positioning the head can be obtained by a novel method quite distinctive from the prior art method, and in that the reproductive output level can be kept constant at all the recording tracks from the innermost recording track to the outermost recording track in the magnetic recording disc to thereby perform magnetic recording with high efficiency.

Figure 5:
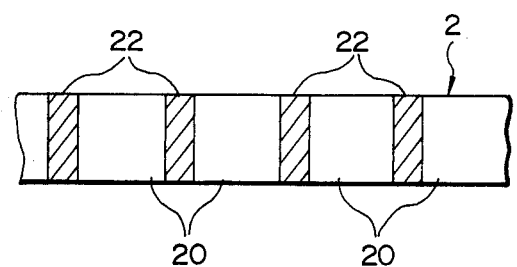
FIG. 5 is a schematic diagram for explaining a second embodiment of the invention.

In the following, a second embodiment of the invention is described. As schematically shown in FIG. 5, the subject according to the second embodiment of the invention is a magnetic recording medium comprising data tracks 2 composed of magnetic layers 20 and non-magnetic layers 22, the magnetic layers and non-magnetic layers alternatively disposed in the direction of recording/reproducing. The magnetic recording medium will be described in more detail with reference to FIG. 6.

Figure 6:
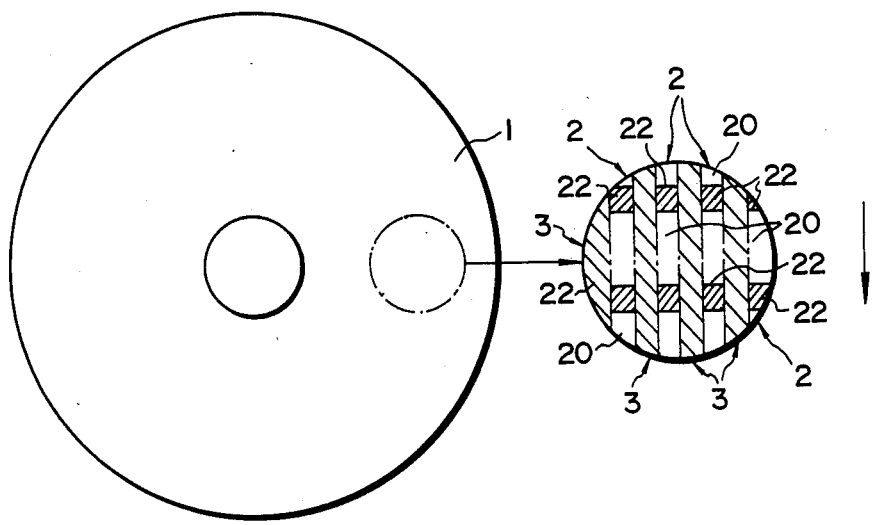
FIG. 6 is a schematic diagram for explaining the magnetic disc according to the second embodiment.

In FIG. 6, a magnetic disc 1, acting as a recording medium, has a plurality of data tracks 2 capable of recording data, and a plurality of non-data tracks 3, those data and non-data tracks being alternately disposed on the disc 1 to form coaxial circles. The respective data track 2 is formed so that magnetic bits 20 and non-magnetic bits 22 are alternatively disposed in the direction of recording/reproducing (that is, in the direction of the arrow A).

The area of the respective magnetic bit 20 is formed by a magnetic layer of a magnetic material, so that information of one bit can be recorded onto one magnetic bit 20. On the other hand, the area of the respective non-magnetic bit 22 is formed by a non-magnetic layer of a non-magnetic material. In this embodiment, the length (in the direction of recording/reproducing) of the non-magnetic bit 22 is shorter than the length of the magnetic bit 20.

Figure 9:
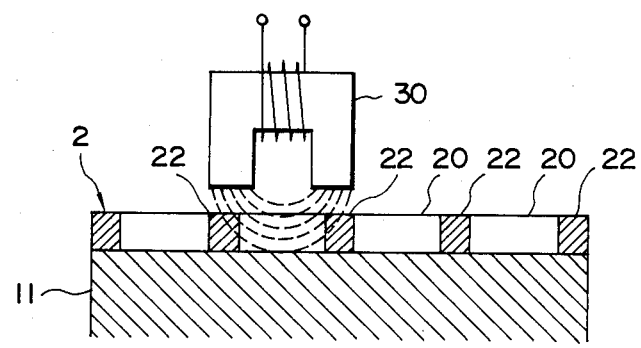
FIG. 9 is an explanatory diagram showing the relation between the data track and the magnetic head.

The pattern of the respective data track 2 having the magnetic bits 20 and the non-magnetic bits 22 alternately disposed can be formed on the disc substrate 11 as shown in FIG. 9 by use of the same technique as described above in the first embodiment.

As described above, according to this embodiment, the overwrite characteristic can be improved and high density can be attained.

Figure 7:
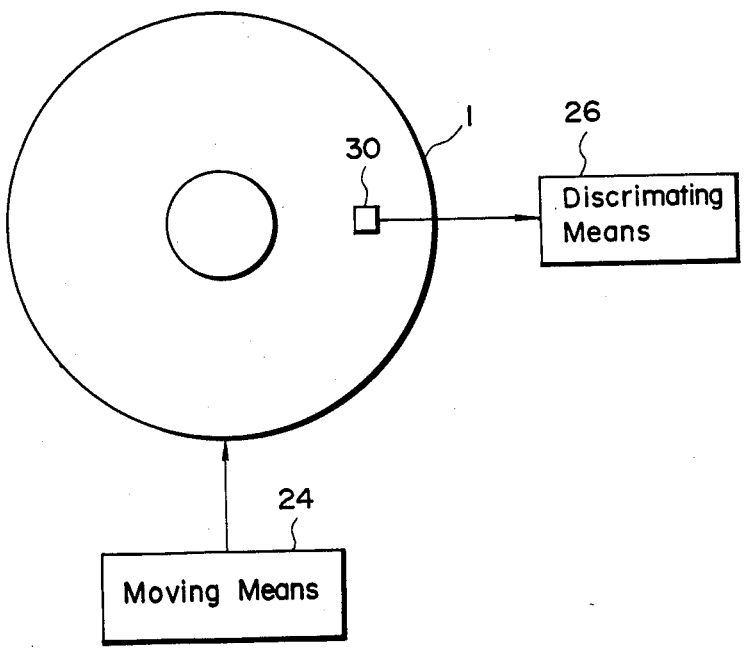
FIG. 7 is a schematic diagram for explaining the magnetic disc reproducing apparatus according to a third embodiment of the invention.

In the following, a third embodiment of the invention is described. The subject of the third embodiment of the invention is a recording/reproducing apparatus in a magnetic disc player using such a magnetic disc as described as the second embodiment. FIG. 7 is a view for explaining the outline of the apparatus, which comprises a reproductive magnetic head 30, moving means 24 for moving the data tracks 2 of the magnetic recording medium 1 relatively to the reproductive magnetic head 30, and discriminating means 26 for discriminating the magnetizing direction of the respective magnetic layer 20 on the data track 2 on the basis of the detection signal produced by the reproductive magnetic head 30.

In the following, the recording/reproducing apparatus is described more in detail with reference to FIGS. 8 through 11.

Figure 8:
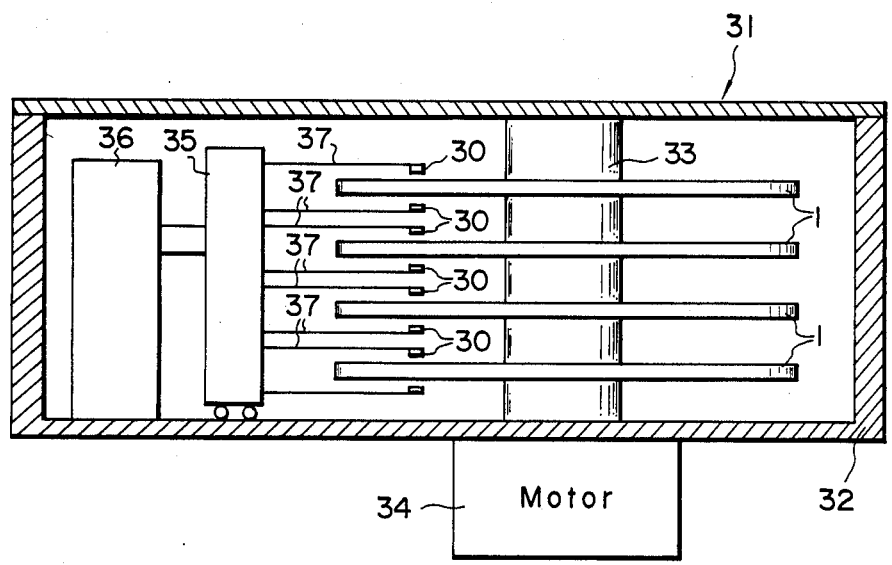
FIG. 8 is a section for explaining the main part of the structure of the magnetic disc reproducing apparatus.

In FIG. 8, a magnetic disc player 31 has a case 32 within which a spindle 33 is rotatably supported. A plurality of magnetic recording discs 1 are mounted on the spindle 33 in parallel to and with separation from each other. A motor 34 acting as disc moving means is connected to the lower end of the spindle 33 to thereby turn the respective magnetic discs 1 through the spindle 33.

At one side within the case 32, a head actuator 35 acting as head positioning means is provided movably in the direction of the radius of the respective magnetic disc 1. A head actuator driving motor 36 gives a radial reciprocating motion to the head actuator 35. The head actuator 35 is provided with arms respectively corresponding to the surfaces of the magnetic recording discs 1. The magnetic heads 30 are provided at the respective forward ends of the arms 37.

As shown in FIG. 9, the width of the gap of the respective magnetic head 30 is selected so that, when recording a specific magnetic bit 20 facing the gap of the head 30, the specific magnetic bit 20 can be magnetized but the two adjacent magnetic bits 20 which are separated from the specific magnetic bit 20 through the respective non-magnetic bits 22 cannot be magnetized because of the presence of the non-magnetic bits 22.

The magnetic bit 20 is magnetized in the direction of running of the track on the surface of the disc so that two values "0" and "1" are formed corresponding to the direction of the magnetic pole (that is, the magnetizing direction). Although the width of the magnetic head 30 is determined on the basis of the length of the magnetic bit 20 and the length of the non-magnetic bit 22 in this embodiment, of course the length of the magnetic bit 20 and the length of the non-magnetic bit 22 may be determined on the basis of the gap width of the magnetic head 30.

Figure 10:
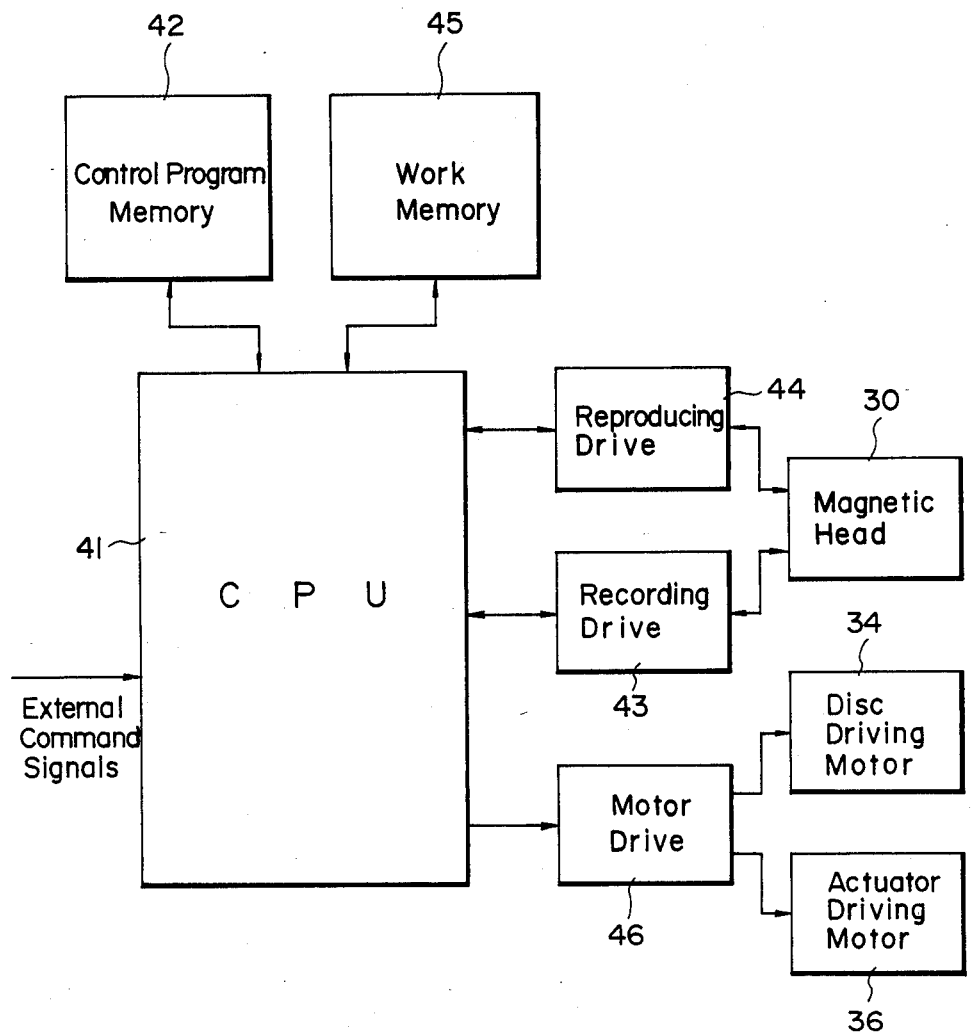
FIG. 10 is an electric circuit block diagram of the recording/reproducing apparatus.

In the following, the electrical construction of the directly aforementioned recording/reproducing apparatus is described with reference to the electrical circuit block diagram of FIG. 10.

A central processing unit (hereinafter abbreviated to "CPU") 41 operates in accordance with a control program stored in a control program memory 42 constituted by a read only memory (ROM) to feed control signals to a recording driving circuit 43 and a reproducing driving circuit 44 in accordance with external command signals applied to the CPU 41. A work memory 35 constituted by a random access memory (RAM) is arranged to temporarily stores the result of operations carried out in the CPU 41 or the like. The CPU 41 controls the disc driving motor 34 and the actuator driving motor 36 to cause recording/reproducing operations of the magnetic head 30 with respect to a necessary data track 2.

The recording driving circuit 43 is responsive to the control signal from the CPU 41 to cause the magnetic head 30 to records the data fed from the CPU 41 successively onto the magnetic bits 20 of the necessary data track 2.

The reproducing driving circuit 44 is responsive to the control signal from the CPU 41 to cause the magnetic head 30 to successively reproduce the data recorded on the magnetic bits 20 of the necessary data track 2 of the magnetic disc 1.

Figure 11:
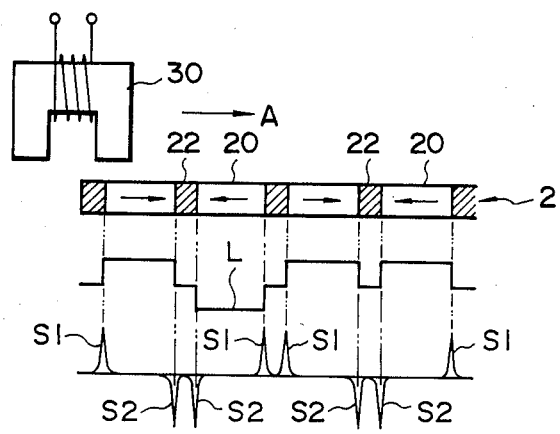
FIG. 11 is a diagram for explaining the relation between the magnetic bit and the detection signal of the magnetic head taken in the magnetizing direction.
Figure 12:
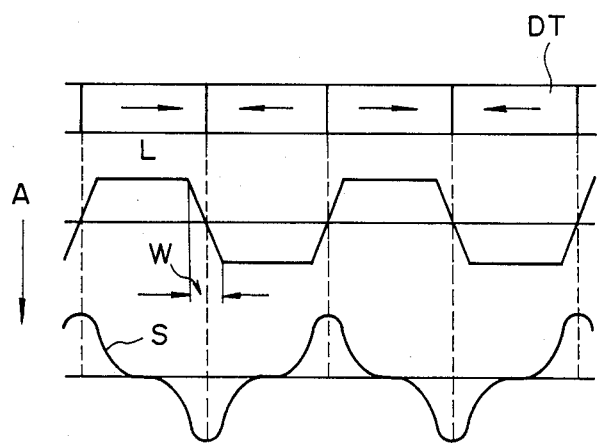
FIG. 12 is a diagram for explaining the relation between the magnetic bit and the detection signal of the magnetic head taken in the magnetizing direction in the prior art.

That is, the magnetic bits 20 of the data track 2 are respectively magnetized in the direction of the arrow of FIG. 11. When the magnetic head 30 moves in the direction of the arrow A, in other words when the data track 2 moves in the direction reversed to the arrow A (in this embodiment the magnetic head is, in fact, stationary), the magnetizing level L clearly changes at the boundary between the magnetic bit 20 and the non-magnetic bit 22. Accordingly, when the magnetic head 30 passes through a rightward magnetized magnetic bit 20 from a non-magnetic bit 22 in FIG. 11, a positive or plus peak current S1 having a steep leading edge is generated. On the other hand, when the magnetic head 30 passes through a non-magnetic bit 22 from the magnetic bit 20, a negative or minus peak current S2 having a steep trailing edge is generated.

On the contrary, when the magnetic head 30 passes through a leftward magnetized magnetic bit 20 from a non-magnetic bit 22 in FIG. 11, a negative or minus peak current S2 having a steep trailing edge is generated. Furthermore, when the magnetic head 30 passes through a non-magnetic bit 22 from the magnetic bit 20, a positive or plus peak current S2 having a steep leading edge is generated.

Accordingly, when the respective magnetic bit 20 of the data track 2 passes through the magnetic head 30, the reproducing driving circuit 44 can judge that the magnetizing direction of the magnetic bit 20 is right in the drawing in the case where a minus peak current S2 next to a plus peak current S1 is generated from the magnetic head 30 or can judge that the magnetizng direction of the magnetic bit 20 is left in the drawing in the case where a plus peak current S1 next to a minus peak current S2 is generated from the magnetic head 30.

When the magnetizing direction is right, a logical value "0" is fed from the reproducing driving circuit 44 to the CPU 31, while when the magnetizing direction is left, a logical value "1" is fed from the reproducing driving circuit 44 to the CPU 31. Accordingly, the information recording on the respective magnetic bit 20 of the data track 2 can be accurately reproduced.

In the case where information is to be recorded on the respective magnetic bit 20 of the data track, on the contrary, information can be easily recorded by the recording driving circuit 43 while controlling the magnetizing direction of the respective magnetic bit 20 through the magnetic head 30.

As described above, this embodiment of the present invention is advantageous in that the magnetic transition width can be greatly reduced to obtain sharp peak currents S1 and S2, that is, sharp reproductive output waveforms, to thereby perform recording with high density, because the respective data track has the magnetic bits 20 and the non-magnetic bits 22 alternately disposed or in other words because the non-magnetic bits are respectively interposed between the adjacent magnetic bits 20. Furthermore, the overwrite characteristic can be improved because the data recording is always made on the respective magnetic bit.

In addition, because information can be read only by discriminating the detection order of the plus and minus currents generated from the magnetic head 30, the reproducing apparatus can be simplified in construction and information can be accurately read.

The invention is not limited to the aforementioned specific embodiment. For example, the length and width of the magnetic bit 20 or those of the non-magnetic bit 22 may be suitably changed. The length of the magnetic bit 20 may be selected to be equal to that of the non-magnetic bit 22. The magnetic bits and the non-magnetic bits on one data track 2 may be different in length from each other. The length and width of the respective magnetic bit 20 or those of the non-magnetic bit 22 may be suitably changed between different data tracks.

Although the embodiment shows the case where the invention is applied to a hard disc, the invention is applicable to other media, such as a floppy disc, a magnetic drum and the like.

In the case where the invention is applied to the other media, information can be reproduced from the recording media with simplified construction.

What is claimed is:

1. A magnetic recording medium comprising data tracks formed of magnetic layers, and non-data tracks formed of non-magnetic layers, said data tracks and said non-data tracks being disposed alternately and formed on a surface of a disc, and said data tracks having respective widths gradually reduced as the position of the data track comes far from a center of said disc toward an outer circumferential part of said disc.

2. A magnetic recording medium according to claim 1, in which said data tracks and said non-data tracks are formed annularly.

3. The magnetic recording medium in accordance with claim 1 wherein said data tracks formed of magnetic layers and non-magnetic layers are disposed alternatively respectively in the direction of recording/reproducing.

4. A magnetic recording medium comprising data tracks formed of magnetic layers, and non-data tracks formed of non-magnetic layers, said data tracks and said non-data tracks being disposed alternately and formed annularly, in which the respective widths of said data tracks formed so as to be gradually reduced as the position of the respective data track comes far from the center of said disc toward the outer circumferential part of said disc is selected on the basis of at least one of a linear velocity taken in a radical direction of said disc, a recording electric current, intensity of leakage magnetic field from a head at the surface of said disc, and a rate of change in magnetic flux.

5. The magnetic recording medium in accordance with claim 4 wherein said data tracks formed of magnetic layers and non-magnetic layers are disposed alternatively respectively in the direction of recording/reproducing.

6. A magnetic recording system comprising:
a magnetic recording medium provided with data tracks composed of magnetic layers and non-magnetic layers, and non-data tracks formed of non-magnetic layers, said data tracks and said non-data tracks being disposed alternatively and formed angularly:
a magnetic head for recording information onto said data tracks with one bit of information corresponding to each magnetic layer on the data tracks and for reproducing information;
moving means for moving said data tracks of said recording medium relative to a reproducing magnetic head; and
discriminating means for discriminating the magnetizing direction of the respective magnetic layer on said data tracks on the basis of a detection signal fed from said reproducing magnetic head.

7. A magnetic recording medium comprising a large plurality of data tracks radially formed on a surface of a disc and composed of magnetic layers and non-magnetic layers, said magnetic layers and non-magnetic layers being disposed alternately in the direction of recording/reproducing.

* * * * *